(12) United States Patent
Hur et al.

(10) Patent No.: US 11,133,032 B1
(45) Date of Patent: Sep. 28, 2021

(54) READER INSTABILITY DETECTION AND RECOVERY

(71) Applicant: Seagate Technology LLC, Fremont, CA (US)

(72) Inventors: Jung Wook Hur, Singapore (SG); Lin Thi Lin, Singapore (SG); Kang Hai Lim, Singapore (SG); Teng Hou Chua, Singapore (SG); XueYi Miao, Singapore (SG); Zhi Ye, Singapore (SG)

(73) Assignee: SEAGATE TECHNOLOGY LLC, Fremont, CA (US)

( * ) Notice: Subject to any disclaimer, the term of this patent is extended or adjusted under 35 U.S.C. 154(b) by 0 days.

(21) Appl. No.: 17/075,354

(22) Filed: Oct. 20, 2020

(51) Int. Cl.
| | |
|---|---|
| *G11B 5/54* | (2006.01) |
| *G11B 27/36* | (2006.01) |
| *G11B 20/18* | (2006.01) |
| *G11B 20/10* | (2006.01) |
| *G06F 11/10* | (2006.01) |
| *G11B 5/02* | (2006.01) |
| *G11B 19/04* | (2006.01) |

(52) U.S. Cl.
CPC .......... *G11B 20/18* (2013.01); *G06F 11/1048* (2013.01); *G11B 5/02* (2013.01); *G11B 19/042* (2013.01); *G11B 20/10388* (2013.01)

(58) Field of Classification Search
CPC .... G11B 5/00; G11B 5/09; G11B 5/54; G11B 33/14; G11B 20/10009; G11B 27/36
USPC ..................................................... 360/55, 75
See application file for complete search history.

(56) References Cited

U.S. PATENT DOCUMENTS

| | | | |
|---|---|---|---|
| 5,777,815 | A | 7/1998 | Kasiraj et al. |
| 6,018,428 | A | 1/2000 | Okamura |
| 6,137,643 | A | 10/2000 | Flynn |
| 6,147,827 | A | 11/2000 | Southerland et al. |
| 6,178,053 | B1 | 1/2001 | Narita |
| 6,249,394 | B1 | 6/2001 | Li et al. |
| 6,421,193 | B1 | 7/2002 | Li |
| 6,490,691 | B1 | 12/2002 | Kimura et al. |
| 6,603,617 | B1 | 8/2003 | Cross |
| 6,690,532 | B1 | 2/2004 | Choo et al. |

(Continued)

FOREIGN PATENT DOCUMENTS

EP 0813187 A2 12/1997

*Primary Examiner* — Nabil Z Hindi
(74) *Attorney, Agent, or Firm* — Westman, Champlin & Koehler, P.A.

(57) ABSTRACT

A method includes detecting a read error during a first read operation by a read sensor on a first track on a data storage medium. The method also includes, after the read error is detected, performing a second read operation by the read sensor on the first track, carrying out bit error value (BEV) measurements for the second read operation, and determining, from the BEV measurements, whether the read sensor produces a marginal BEV, which is between first and second predetermined BEV thresholds. In response to determining that the read sensor produces the marginal BEV, a third read operation by the read sensor on the first track is carried out, and BEV measurements for the third read operation are performed. When the BEV measurements from the second and third read operations meet at least one predetermined read sensor instability criterion, it is concluded that the read sensor is unstable.

18 Claims, 6 Drawing Sheets

(56) References Cited

U.S. PATENT DOCUMENTS

| | | |
|---|---|---|
| 6,735,033 B1 | 5/2004 | Codilian et al. |
| 7,062,698 B2 | 6/2006 | Yang |
| 7,430,177 B2 | 9/2008 | Mir et al. |
| 7,974,039 B1 | 7/2011 | Xu et al. |
| 8,107,178 B2 | 1/2012 | Takahashi |
| 8,605,383 B1 | 12/2013 | Wang et al. |
| 8,755,136 B1 | 6/2014 | Ng et al. |
| 8,797,664 B1 | 8/2014 | Guo et al. |
| 8,934,185 B2 | 1/2015 | Hur et al. |
| 9,013,820 B1 * | 4/2015 | Camalig .......... G11B 20/10009 360/55 |
| 9,117,489 B1 | 8/2015 | Dang et al. |
| 9,122,625 B1 | 9/2015 | Lu et al. |
| 9,153,283 B1 | 10/2015 | Xi et al. |
| 9,495,243 B2 | 11/2016 | Lu et al. |
| 9,548,070 B1 | 1/2017 | Chatradhi et al. |
| 9,589,587 B1 * | 3/2017 | Chu ................... G11B 5/02 |
| 9,589,592 B1 | 3/2017 | Son et al. |
| 9,812,164 B2 | 11/2017 | Son et al. |
| 2003/0030934 A1 | 2/2003 | Schaff et al. |
| 2003/0065992 A1 | 4/2003 | Yang |

* cited by examiner

READER INSTABILITY DETECTION AND RECOVERY

SUMMARY

In a one embodiment, a method is provided. The method includes detecting a read error during a first read operation by a read sensor to read data from a first track on a data storage medium. The method also includes, after the read error is detected, performing a second read operation by the read sensor on the first track, carrying out bit error value measurements for the second read operation, and determining, from the bit error value measurements, whether the read sensor produces a marginal bit error value. The marginal bit error value is between first and second predetermined bit error value thresholds. The method further includes, in response to determining that the read sensor produces the marginal bit error value, carrying out a third read operation by the read sensor on the first track, and carrying out bit error value measurements for the third read operation. When bit error value measurements from the second and third read operations meet at least one predetermined read sensor instability criterion, it is concluded that the read sensor is unstable.

In another embodiment, an apparatus is provided. The apparatus includes a controller, and a read channel communicatively coupled to the controller. The read channel includes a reader instability detection circuit. The apparatus also includes a preamplifier communicatively coupled to the read channel, and a head communicatively coupled to the preamplifier. The head includes at least one read sensor. The reader instability detection circuit is configured to determine whether the read sensor is unstable by evaluating whether the read sensor produces a marginal bit error value or worse during one or more read operations by the read sensor in communication with the preamplifier, the read channel and the controller. The marginal bit error value is between first and second predetermined bit error value thresholds.

In yet another embodiment, a method is provided. The method includes detecting a read error during a first read operation by a read sensor to read data from a first track on a data storage medium. The method also includes, after the read error is detected, determining whether the read sensor is unstable by evaluating whether the read sensor performs marginally or worse during one or more subsequent read operations. The marginal read sensor performance is determined by comparing at least one readback value from the read sensor with one or more marginal performance indication thresholds. The method further includes, in response to determining that the read sensor performs marginally or worse, concluding that the read sensor is unstable.

Other features and benefits that characterize disclosed aspects will be apparent upon reading the following detailed description and review of the associated drawings.

DETAILED DESCRIPTION OF ILLUSTRATIVE EMBODIMENTS

Embodiments described below relate to reader instability detection and recovery in data storage devices such as hard disc drives (HDDs) and hybrid drives. Prior to providing details regarding the reader instability and recovery, a description of an illustrative operating environment is provided below.

Figure 1:
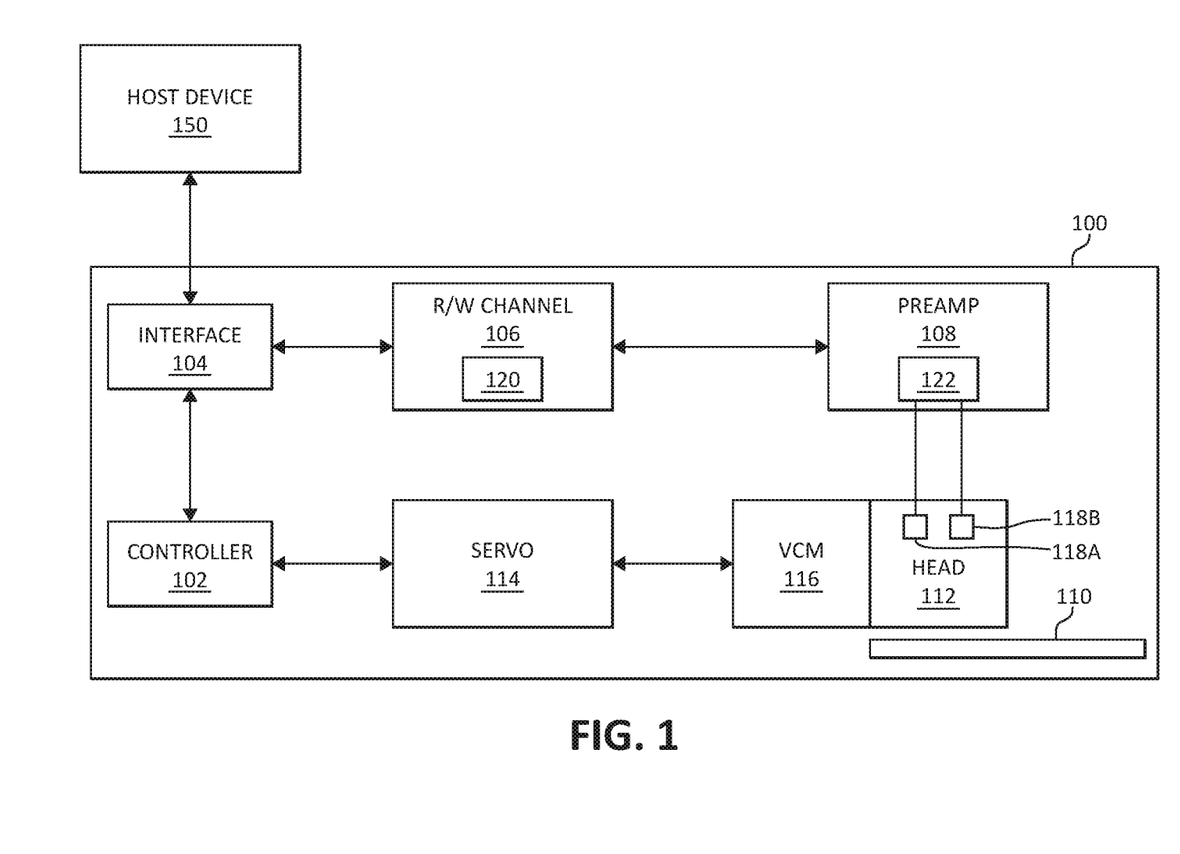
FIG. 1 is a simplified block diagram of a data storage device in accordance with one embodiment.

FIG. 1 shows an illustrative operating environment in which certain embodiments disclosed herein may be incorporated. The operating environment shown in FIG. 1 is for illustration purposes only. Embodiments of the present disclosure are not limited to any particular operating environment such as the operating environment shown in FIG. 1. Embodiments of the present disclosure are illustratively practiced within any number of different types of operating environments.

It should be noted that the same reference numerals are used in different figures for same or similar elements. It should also be understood that the terminology used herein is for the purpose of describing embodiments, and the terminology is not intended to be limiting. Unless indicated otherwise, ordinal numbers (e.g., first, second, third, etc.) are used to distinguish or identify different elements or steps in a group of elements or steps, and do not supply a serial or numerical limitation on the elements or steps of the embodiments thereof. For example, "first," "second," and "third" elements or steps need not necessarily appear in that order, and the embodiments thereof need not necessarily be limited to three elements or steps. It should also be understood that, unless indicated otherwise, any labels such as "left," "right," "front," "back," "top," "bottom," "forward," "reverse," "clockwise," "counter clockwise," "up," "down," or other similar terms such as "upper," "lower," "aft," "fore," "vertical," "horizontal," "proximal," "distal," "intermediate" and the like are used for convenience and are not intended to imply, for example, any particular fixed location, orientation, or direction. Instead, such labels are used to reflect, for example, relative location, orientation, or directions. It should also be understood that the singular forms of "a," "an," and "the" include plural references unless the context clearly dictates otherwise.

It will be understood that, when an element is referred to as being "connected," "coupled," or "attached" to another element, it can be directly connected, coupled or attached to the other element, or it can be indirectly connected, coupled, or attached to the other element where intervening or intermediate elements may be present. In contrast, if an element is referred to as being "directly connected," "directly coupled" or "directly attached" to another element, there are no intervening elements present. Drawings illustrating direct connections, couplings or attachments between elements also include embodiments, in which the elements are indirectly connected, coupled or attached to each other.

Referring now to FIG. 1, an example embodiment of a data storage device (e.g., HDD or hybrid drive) 100 in which reader instability detection and recovery may be carried out, is shown. Data storage device 100 includes a processor or controller 102 that directs or manages high level operations of device 100. An interface circuit 104 facilitates communication between device 100 and a host device 150. A read/write channel 106 operates in conjunction with a pre-amplifier/driver circuit (preamp) 108 to write data to and to read data from a data storage medium (e.g., a data storage disc) 110. Preamp 108 also acts as a power supply to electrical components included in a recording head such as a read transducer, a write transducer, heaters, etc. Preamp 108 is illustratively electrically connected to a recording head 112 through a head gimbal assembly (HGA) circuit (not shown) that is connected to preamp 108 and to one or more recording head 112 electrical connection points. A servo circuit 114 provides closed loop positional control for a voice coil motor (VCM) 116 that positions recording head 112 at a desired location over the data storage medium 110.

In some embodiments, recording head 112 may include a single reader or read sensor (e.g., a single magnetoresistive (MR) sensor) 118A. In other embodiments, recording head 112 may include multiple readers or read sensors (e.g., multiple MR sensors) 118A, 118B, etc. It should be noted that, in some embodiments, head 112 may not include any write element, and may include one or more read sensors 118A, 118B. In such embodiments, head 112 is a read head. As used herein, the term head is utilized for a slider that can include read and write elements or just read elements and no write elements. In the interest of brevity, details about MR sensor 118A, 118B structure and operation are not provided herein. When using MR sensors (e.g., 118A, 118B), "head instability" is a phenomenon whereby the MR sensor domain goes into an instability state. The MR sensor 118A, 118B may enter into such a state at any time during the life of the data storage device 100.

The embodiment of FIG. 1 employs a reader instability detection circuit 120 in the read/write channel 106 to detect read sensor 118A, 118B instability. Reader instability detection circuit 120 may include hardware and/or firmware that is configured to carry out reader instability detection in a manner described further below. It should be noted that one or both read sensors 118A, 118B may become unstable at different times. Once a read sensor 118A, 118B is determined to be unstable, data storage device 100 employs a reader recovery circuit 122 in preamp 108 to apply a suitable shock signal to the read sensor 118A, 118B to enable recovery. In some embodiments, the reader recovery circuit 122 may include reset pulse generation circuitry (e.g., current and/or voltage circuitry configured to provide the bias shock) that generates a bias shock current to, for example, arrange domains, in the same direction, which are unstable on an easy axis of the MR sensor 118A, 118B. It should be noted that the reset pulse is different from reader bias currents which are supplied by preamp 108 to the MR sensors 118A, 118B, so that the drive senses changes in resistance values of the MR sensors 118A, 118B using current (or voltage) in response to magnetic information recorded on the data storage medium (e.g., magnetic data storage disc) 110.

It should be noted that, in some embodiments, data storage device 100 may include head heating circuitry (not shown) that may be used for head-media spacing (HMS) control, for example. In certain embodiments, when one or both MR sensors 118A, 118B are found to be unstable, a thermal shock may be applied to head 112 by the head heating circuit (using, for example, high heat power) to recover the MR sensor(s) 118A, 118B. The head heating circuitry may be a part of preamp 108 circuitry in some embodiments.

In embodiments of the disclosure, reader instability detection circuit 120 performs bit error rate calculations for data sectors on tracks, and employs those bit error rate calculations to make a determination as to whether the read sensor 118A, 118B is unstable. If the read sensor 118A, 118B is found to be unstable, a bias shock or thermal shock may be applied to the read sensor 118A, 118B, to rearrange magnetic domains as noted above. An example data storage disc surface with tracks and sectors is described below in connection with FIG. 2

Figure 2:
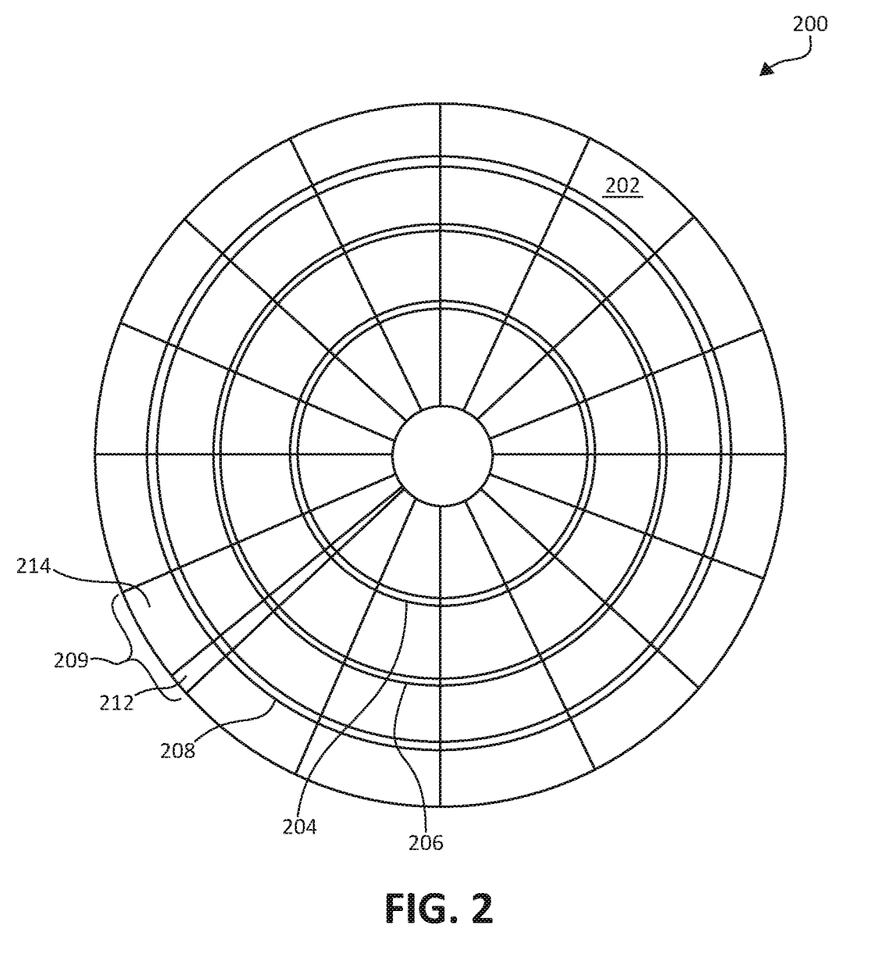
FIG. 2 is a diagrammatic representation of a simplified top view of a data storage disc that may be included in the data storage device of FIG. 1.

FIG. 2 is a diagrammatic representation of a simplified top view of a disc 200 having a surface 202 which may be used in conjunction with a sectored servo system (also known as an embedded servo system) according to a specific example. Disc 200 can be, for example, data storage medium 110 of FIG. 1. As illustrated in FIG. 2, disc 200 includes a plurality of concentric tracks 204, 206 and 208 for storing data on the disc surface 202. Although FIG. 2 only shows a small number of tracks (e.g., 3) for ease of illustration, it should be appreciated that typically many thousands of tracks are included on the surface 202 of disc 200.

Each track 204, 206 and 208 is divided into a plurality of sectors 209. Each of sectors 209 are typically divided into a servo portion or servo sector 212 and a data storage portion or data sector 214. In the interest of simplification, the servo and data storage portions are shown in only one sector. Data may be read from tracks such 204, 206 and 208 with a head having, for example, a single reader (e.g., a single MR sensor (e.g., 118A or 118B of FIG. 1)) or multiple readers (e.g., two or more MR sensors (e.g., 118A, 118B, etc.)). As noted above, during the life of the data storage device, a read sensor (e.g., MR sensor) may become unstable.

Figure 3:
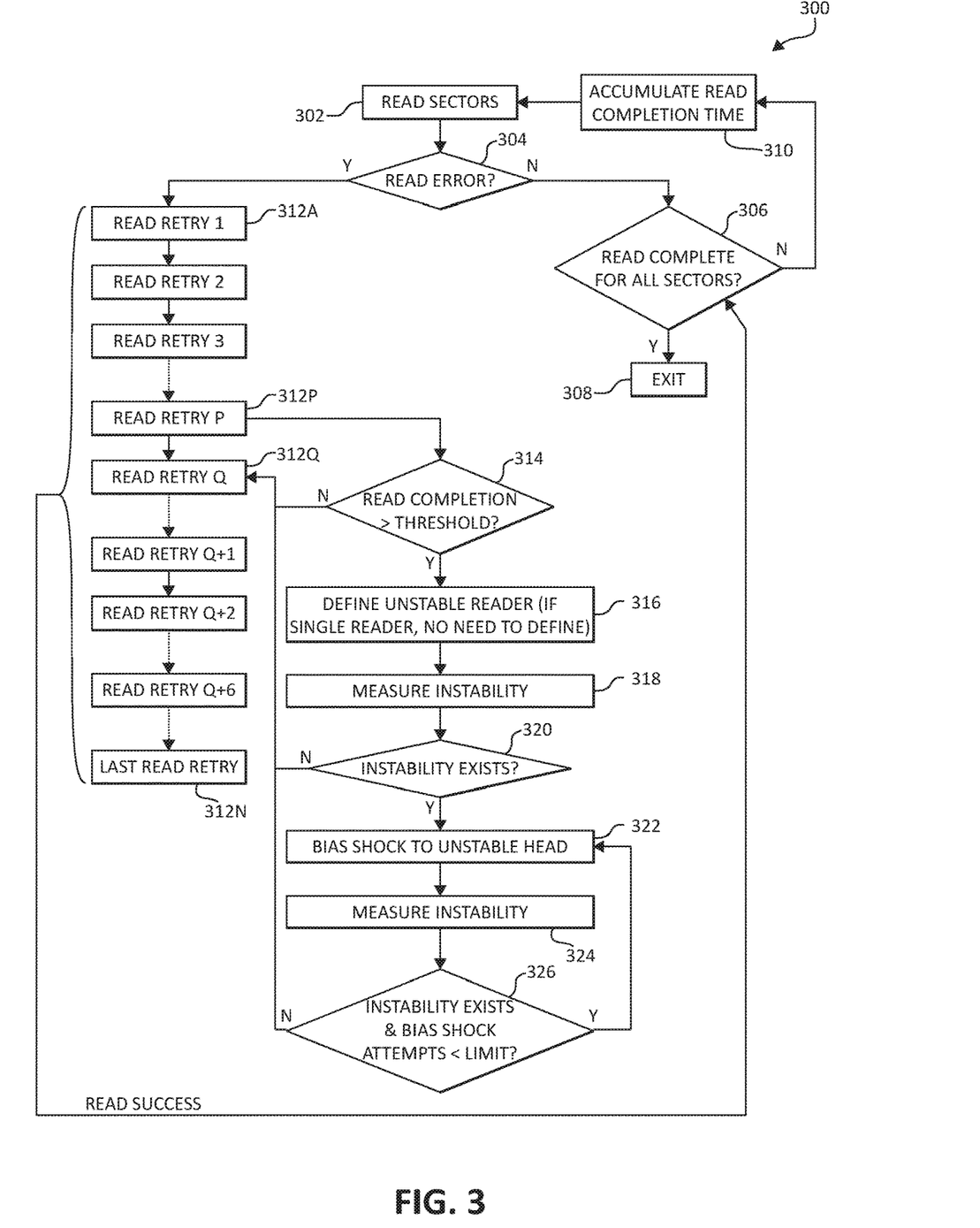
FIG. 3 is a flowchart of a method in which a read sensor found to be unstable may be recovered in accordance with one embodiment.

FIG. 3 is a flowchart of a method 300 in which a read sensor found to be unstable may be recovered in accordance with one embodiment. At 302, one or more readers (e.g., MR sensor 118A and/or MR sensor 118B of FIG. 1) read sectors (e.g., 209 of FIG. 2) of a track (e.g., 204, 206, 208 of FIG. 2). At 304, a determination is made as to whether a read error has occurred when reading the track. If no read error is detected, control passes to 306. At 306, a determination is made as to whether the read operation for the track is completed (e.g., a determination is made as to whether a predetermined number of sectors (e.g., a few sectors, hundreds of sector or thousands of sectors determined by the host) are read). If the predetermined number sectors of the track are read, at 308, the read operation ends or exits. If the predetermined number of sectors of the track are not yet read, a read completion time is accumulated at 310. Upon completion of 310, control passes to 302 to continue with the read operation.

If a read error is detected at 304, control passes to 312A where a read retry operation is carried out. In general, a first predetermined number (one or more) of retry operations may be carried out (312A-312P). If, after the first predetermined number of read retry operations, data from the erroneous sector/track is not recovered, control passes to 314. At 314, a determination is made as to whether the read completion time (accumulated at 310) is greater than a predetermined read completion time threshold. If the read completion time is less than or equal to the read completion time threshold, the read operations are continued at 312Q. If the read completion time is greater than the read completion time threshold, the reader may be unstable and control passes to 316. It should be noted that, if any one of retry operations 312A-312N is successful in reading the data, control passes to 306 where a check as to whether all the sectors to satisfy the host read command are read.

If the head has multiple read sensors, the active one of the multiple read sensors (e.g., the read sensor that produced the error at 304 and that was employed in the retry operations 312A-312P) is identified for instability detection at 316. It should be noted that, if the head includes a single read sensor, 316 is skipped. At 318, instability determination measurements are carried out for the single read sensor or the identified one of the multiple read sensors. At 320, based on the instability measurements, a determination is made as to whether instability exists in the single read sensor or the selected one of the multiple read sensors. If the single read sensor or the identified one of the multiple read sensors is unstable, at 322, a bias shock and/or a thermal shock is applied to the unstable head by, for example, reader recovery circuit 122 of FIG. 1.

At 324, instability determination measurements are again carried out for the single read sensor or the selected one of the multiple read sensors. At 326, a determination is made as to whether the instability still exists and whether the applied number of bias shocks and/or thermal shocks are below a predetermined bias shock number threshold. If the instability still exists and the bias shocks and/or thermal shocks applied to the read sensor are below the predetermined bias shock and/or thermal shock number threshold, control returns to 322, and 322-326 are repeated until either the read sensor is no longer unstable or the predetermined bias shock and/or thermal shock number threshold is met or exceed. If the reader is no longer unstable or the predetermined bias shock and/or thermal shock number threshold is met or exceed, control passes to 312Q where the read retry operations are continued. The read retry operation may be repeated until 312N, which is a read retry number limit. If after exhausting all the read retry attempts, the data still cannot be read, a read error may be returned to the host (e.g., 150 of FIG. 1).

As noted above in connection with FIG. 1, head 112 may have a single read sensor (e.g., sensor 118A) or may include multiple read sensors (e.g., 118A, 118B, etc.). Embodiments for determining whether the single read sensor (e.g., 118A) is unstable and whether a particular one of two read sensors (e.g., 118A or 118B) is unstable are described below in connection with FIGS. 4A and 4B, respectively.

Figure 4A:
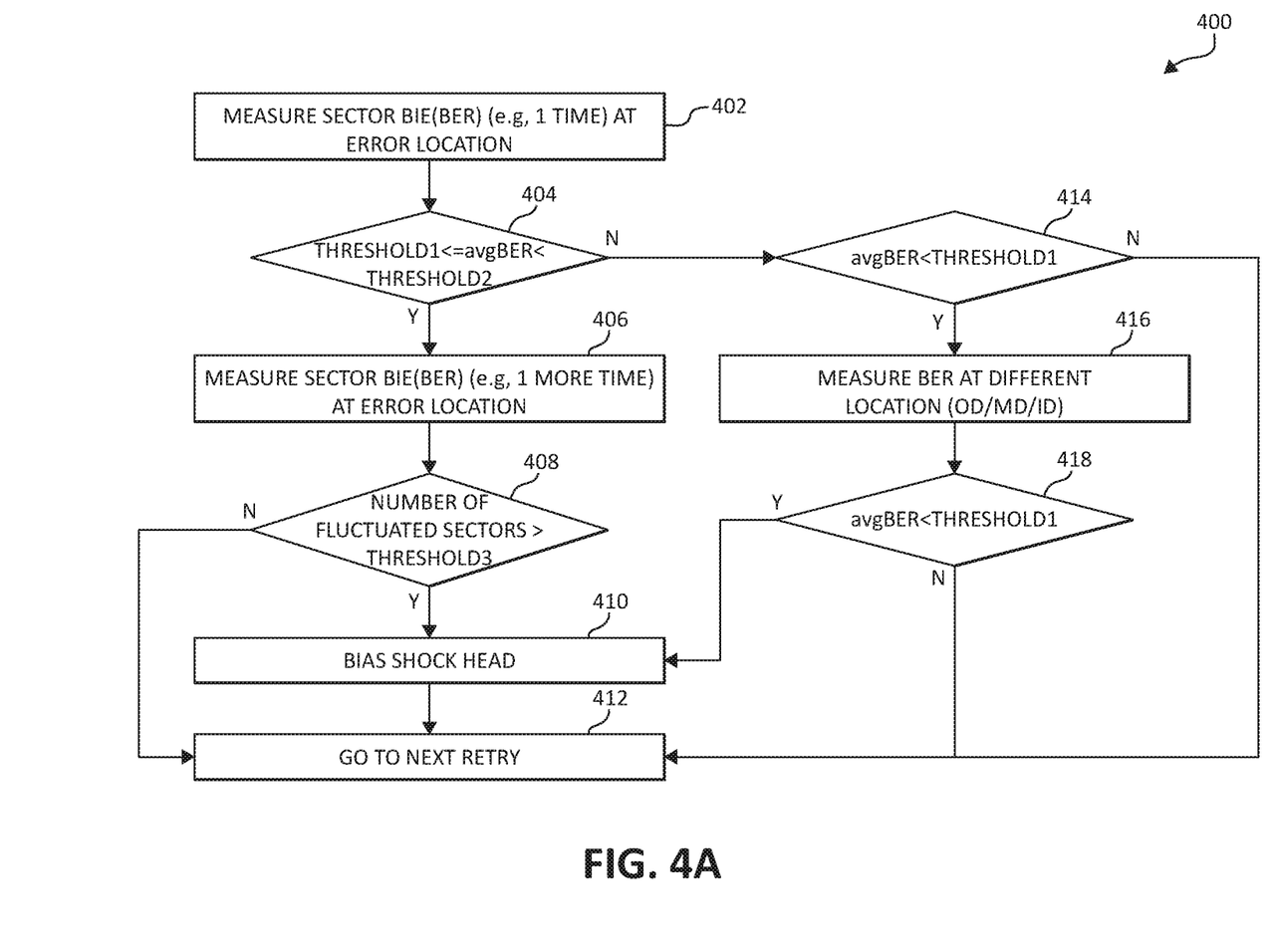
FIG. 4A is a flowchart of a method of determining whether a read sensor within a single-reader head is unstable in accordance with one embodiment.

FIG. 4A is a flowchart of a method 400 of determining whether a read sensor within a single-reader head is unstable in accordance with one embodiment. Method 400 or portions of method 400 may be carried out at one or more of 318-326 of FIG. 3. At 402, the track (204, 206 or 208 of FIG. 2) at which a read error was detected, for example, during performance of 304 of FIG. 3, sector bits in error (BIE) or sector bit error rate (BER) for each different sector (e.g., 209 of FIG. 2) or each data sector portion (e.g., 214 of FIG. 2) is measured. All sector BIE and/or BER values may be determined for data read by the read sensor during a first single disc revolution. At 404, a determination is made as to whether an average BER for the track (calculated from the BIE and/or BER values of the individual sectors) is within a range of interest to be qualified as a marginal BER (e.g., is greater than or equal to a first predetermined BER threshold (Threshold 1 in FIG. FIGS. 4A and 4B) and less than or equal to a second predetermined BER threshold (Threshold 2 in FIGS. 4A and 4B)). It should be noted that BER is a negative number, and therefore the first predetermined BER threshold (Threshold 1) is a greater negative number than (e.g., lower/worse than) the second predetermined BER threshold (Threshold 2). FIG. 5A is a BER distribution graph 500 showing a poor BER region 502 and a marginal BER region 504.

Referring back to FIG. 4A, if the average BER for the track is found to be within the range of interest (e.g., is a marginal BER) at 404, control passes to 406 at which sector BIE or sector BER for each different sector or each data sector portion of the same track (at which the error occurred) is measured again. All sector BIE and/or BER values may be determined for data read by the read sensor during a second single disc revolution.

Figure 5A:
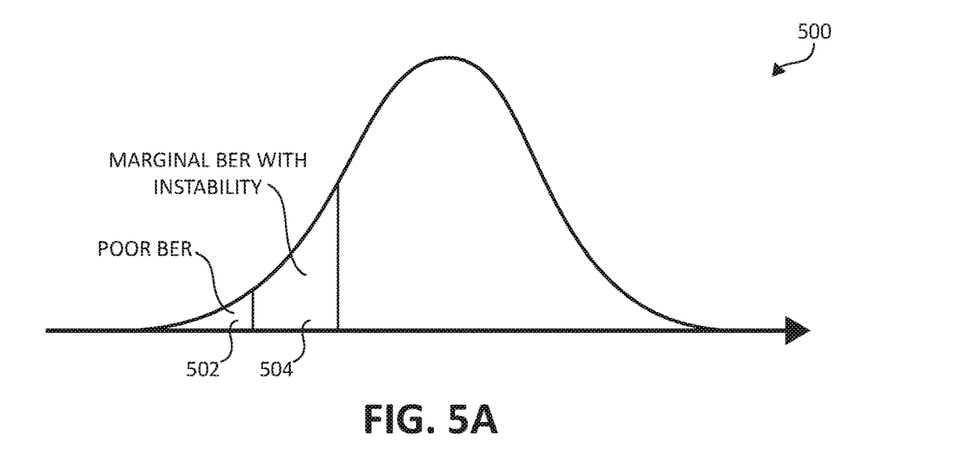
FIG. 5A is a bit error rate distribution graph.
Figure 5B:
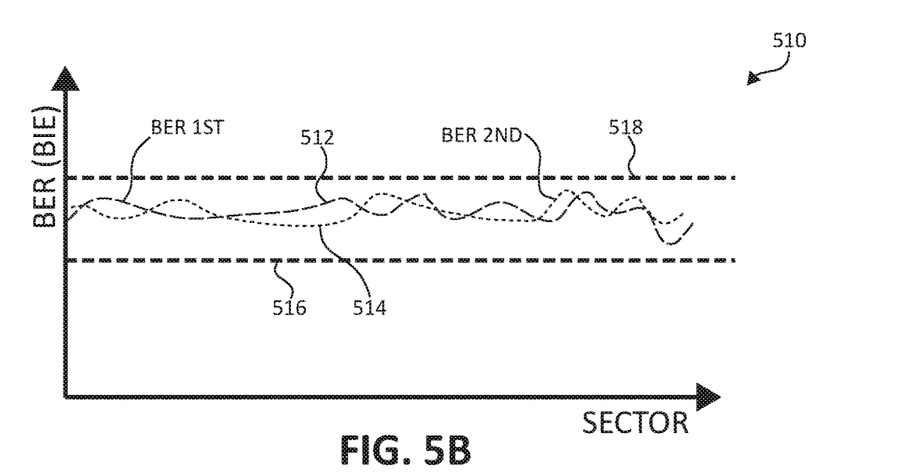
FIG. 5B is a graph including plots of sector bit error rate values.

FIG. 5B is a graph 510 including plots of sector BER or BIE values. In FIG. 5B, plot 512 represents BER or BIE values obtained at 402 for the different sectors, and plot 514 represents BER or BIE values obtained at 406 for the different sectors. Graph 510 also shows first predetermined BER threshold 516 and second predetermined BER threshold 518.

Figure 5C:
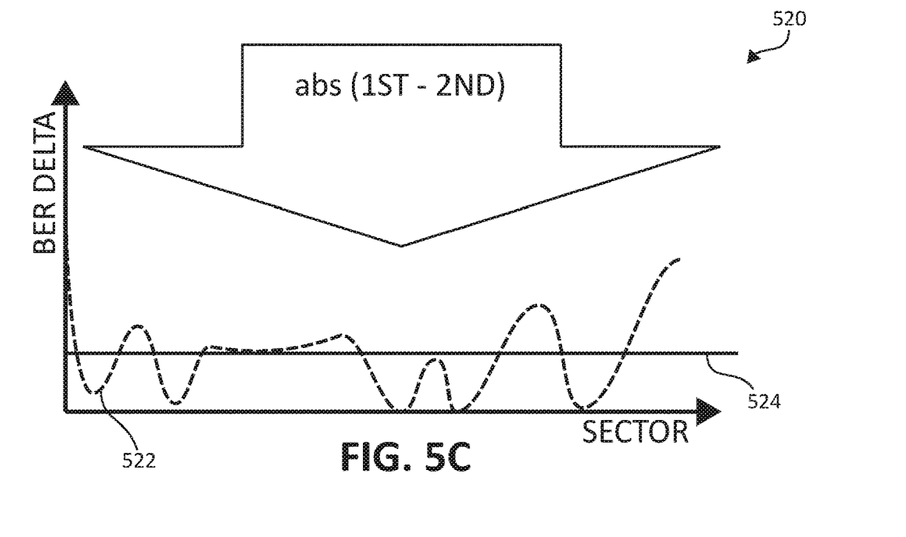
FIG. 5C is a graph showing differences in bit error rate values obtained from different read operations on a same track.

FIG. 5C is a graph 520 that includes a plot 522 of a difference between absolute values of sector BER or BIE (BER Delta) obtained at 402 and 406 (of FIG. 4A). FIG. 5C also shows a predetermined BER difference threshold (dBER) 524. As can be seen in FIG. 5C, some of the BER Delta values are above dBER. Sectors that produced BER Delta values above dBER are referred to herein as fluctuated sectors.

Figure 4B:
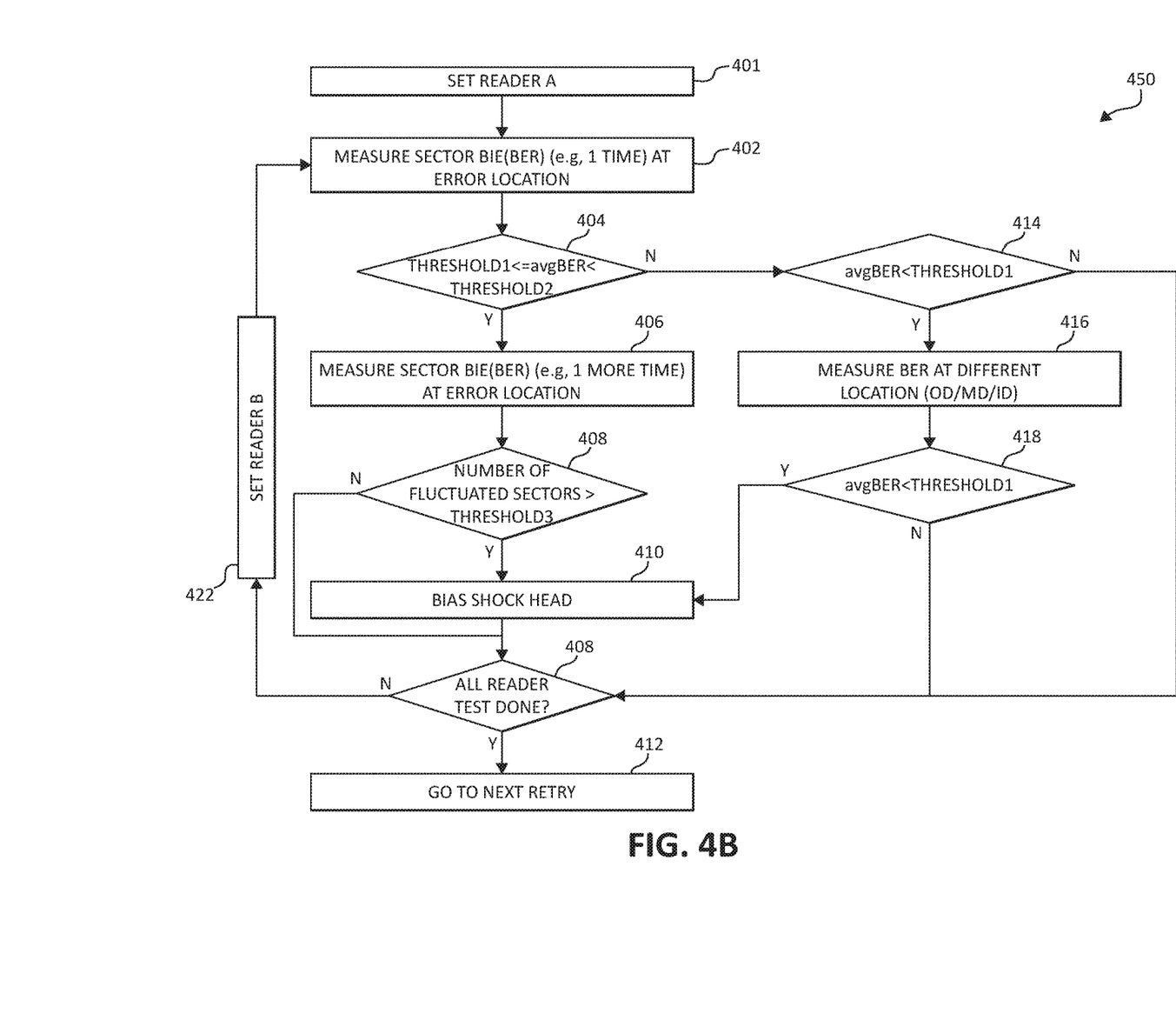
FIG. 4B is a flowchart of a method of determining whether one or more read sensors within a multi-reader head are unstable in accordance with one embodiment.

Referring back to FIG. 4A, at 408, a determination is made as to whether a number of fluctuated sectors is greater than a predetermined number of fluctuated sectors (Threshold 3 in FIGS. 4A and 4B). If the number of fluctuated sectors is greater than the predetermined number of fluctuated sectors, at 410, a bias shock and/or thermal shock is applied to the read sensor, and the method proceeds to a next retry at 412. If the number of fluctuated sectors is less than or equal to the predetermined number of fluctuated sectors, a determination is made that the read sensor is not unstable, and thus 410 is skipped, and the method proceeds to a next retry at 412 (e.g., 312Q of FIG. 3).

Referring back to 404 of FIG. 4A, if the average BER for the track is found to be outside the range of interest (e.g., is not a marginal BER), control passes to 414. At 414, a determination is made as to whether the average BER for the track is less than the first predetermined BER threshold. If the average BER for the track is greater than or equal to the first predetermined BER threshold, the method proceeds to a next retry at 412 (e.g., 312Q of FIG. 3). If, at 414, the average BER for the track is found to be less than the first predetermined BER threshold, control passes to 416 where sector BER values are measured at one or more different tracks to determine whether the poor BER is from a failed location problem or a problem with the reader itself. The one or more different tracks may be any other track or tracks on the disc surface (e.g., an inner diameter (ID) track, a middle diameter (MD) track, and/or an outer diameter (OD) track). At 418, if the average BER for the other track(s) is less than the first predetermined BER threshold, at 410, a bias shock is applied to the read sensor, and the method proceeds to a next retry at 412 (e.g., 312Q of FIG. 3). If, at 418, the average BER for the ID, MD and OD tracks is greater than or equal to the first predetermined BER threshold, 410 is bypassed and the method proceeds directly to a next retry at 412 (e.g., 312Q of FIG. 3).

FIG. 4B is a flowchart of a method 450 of determining whether one or multiple read sensors within a multi-reader head are unstable in accordance with one embodiment. In general, method 450 applies to a head with two or more read sensors. The method 450 is substantially similar to method 400 of FIG. 4A. Method 450 adds a reader/read sensor selection. At 401, a first read sensor is selected, and the method 450 proceeds according to method 400 of FIG. 4A. However, prior to proceeding to a next retry at 412, at 420, a determination is made as to whether all read sensors are tested. If all read sensors are not tested, a next read sensor (e.g., a second read sensor) is selected at 422, and the method 450 again proceeds according to method 400 of FIG. 4A. The method 450 completes when all readers in the head are treated for instability.

In the embodiments described above in connection with FIGS. 4A and 4B use BER and average BER to determine whether the read sensor is unstable. However, as indicated above, BIE may be used instead of BER for the read sensor instability determination. In general, any suitable bit error value (e.g., BER, BIE, etc.) and predetermined bit error value thresholds (e.g., first predetermined bit error value threshold, second predetermined bit error value threshold, etc.) may be utilized for the reader instability determination in accordance with the methods described in FIGS. 4A and 4B). The first predetermined bit error value threshold is more negative (or lower/worse) than the second predetermined bit error value threshold. In addition to, or instead of, bit error values, other read signal quality indicators such as signal amplitude (e.g., servo signal and/or data signal amplitudes) may also by utilized to determine read sensor instability. Thus, a general method embodiment includes detecting a read error during a first read operation by a read sensor to read data from a first track on a data storage medium. The method also includes, after the read error is detected, determining whether the read sensor is unstable by evaluating whether the read sensor performs marginally or worse during one or more subsequent read operations. The marginal read sensor performance is determined by comparing at least one readback value from the read sensor with one or more marginal performance indication thresholds. The method further includes, in response to determining that the read sensor performs marginally or worse, concluding that the read sensor is unstable.

In accordance with various embodiments, the methods described herein may be implemented as one or more software programs running on one or more microprocessors or controller devices, such as the microprocessor included in data storage device 100. Dedicated hardware implementations including, but not limited to, application specific integrated circuits, programmable logic arrays and other hardware devices can likewise be constructed to implement the methods described herein. Instructions stored on a computer-readable storage device (for example, storage element/storage medium 110), that when executed by a processor device (for example, controller 102) configure the processor device to execute the steps of the methods described herein.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be reduced. Accordingly, the disclosure and the figures are to be regarded as illustrative rather than restrictive.

One or more embodiments of the disclosure may be referred to herein, individually and/or collectively, by the term "invention" merely for convenience and without intending to limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

In addition, in the foregoing Detailed Description, various features may be grouped together or described in a single embodiment for the purpose of streamlining the disclosure. This disclosure is not to be interpreted as reflecting an intention that the claimed embodiments employ more features than are expressly recited in each claim. Rather, as the following claims reflect, inventive subject matter may be directed to less than all of the features of any of the disclosed embodiments.

The above-disclosed subject matter is to be considered illustrative, and not restrictive, and the appended claims are intended to cover all such modifications, enhancements, and other embodiments, which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method comprising:
    detecting a read error during a first read operation by a read sensor to read data from a first track on a data storage medium;
    after the read error is detected, performing a second read operation by the read sensor on the first track, carrying out bit error value measurements for the second read operation, and determining, from the bit error value measurements, whether the read sensor produces a marginal bit error value, the marginal bit error value being between first and second predetermined bit error value thresholds;
    in response to determining that the read sensor produces the marginal bit error value, carrying out a third read operation by the read sensor on the first track, and carrying out bit error value measurements for the third read operation; and
    when the bit error value measurements from the second and third read operations meet at least one predetermined read sensor instability criterion, concluding that the read sensor is unstable.

2. The method of claim 1 and further comprising, in response to the read sensor being unstable, carrying out a read sensor recovery operation to restore the read sensor to a stable state.

3. The method of claim 2 and wherein the carrying out the read sensor recovery operation comprises applying at least one of a bias shock or a thermal shock to the read sensor.

4. The method of claim 1 and further comprising performing at least one read retry operation with the read sensor after detecting the read error and before performing the second read operation.

5. The method of claim 1 and wherein carrying out bit error value measurements for the second read operation on the first track comprises measuring a bit error value for each individual sector of the first track for the second read operation.

6. The method of claim 5 and wherein determining whether the read sensor produces the marginal bit error value for the second read operation comprises:
computing an average bit error value of the measured bit error values of the individual sectors of the track for the second read operation; and
determining whether the computed average bit error value for the second read operation is between the first and second predetermined bit error value thresholds.

7. The method of claim 6, and wherein carrying out bit error value measurements for the third read operation comprises measuring a bit error value for each individual sector of the first track for the third read operation.

8. The method of claim 7 and further comprising:
determining absolute values of differences between the bit error values for the individual sectors of the first track for the second read operation and the bit error values for the individual sectors of the first track for the third read operation to obtain sector bit error fluctuation values;
comparing the sector bit error fluctuation values with a predetermined sector bit error fluctuation threshold; and
when a number of sector bit error fluctuation values above the predetermined sector bit error fluctuation threshold are greater than a predetermined number of sectors, concluding that the read sensor is unstable,
wherein the number of sector bit error fluctuation values above the predetermined sector bit error fluctuation threshold being greater than the predetermined number of sectors is the at least one predetermined reader instability criterion.

9. The method of claim 1 and further comprising:
carrying out the bit error value measurements for the second read operation on the first track by measuring a bit error value for each individual sector of the first track for the second read operation;
computing an average bit error value of the measured bit error values of the individual sectors of the track for the second read operation; and
determining whether the computed average bit error value for the second read operation is not between the first and second predetermined bit error rate thresholds.

10. The method of claim 9 and further comprising, when the computed average bit error value for the second read operation is not between the first and second predetermined bit error value thresholds, determining whether the computed average bit error value for the second read operation is less than the first predetermined bit error value threshold.

11. The method of claim 10 and further comprising, in response to the computed average bit error value for the second read operation being less than the first predetermined bit error value threshold, carrying out a fourth read operation on a track other than the first track, and carrying out bit error value measurements for the fourth read operation.

12. The method of claim 11 and further comprising:
computing an average bit error value for the fourth read operations; and
when the average bit error value for the fourth read operations is below the first predetermined bit error value threshold, concluding that the average bit error value for the fourth read operations is a poor bit error value and the read sensor is unstable.

13. The method of claim 12 and further comprising, in response to the read sensor being unstable, carrying out a read sensor recovery operation to restore the read sensor to a stable state.

14. The method of claim 13 and wherein the carrying out the read sensor recovery operation comprises applying at least one of a bias shock or a thermal shock to the read sensor.

15. The method of claim 2 and wherein the read sensor is a first read sensor of a plurality of read sensors in a same head, and the at least one of the bias shock or the thermal shock is applied to the first read sensor and not applied to the other ones of the plurality of read sensors in the head.

16. An apparatus comprising:
a controller;
a read channel communicatively coupled to the controller, the read channel comprising a reader instability detection circuit;
a preamplifier communicatively coupled to the read channel;
a head communicatively coupled to the preamplifier, the head comprising at least one read sensor; and
the reader instability detection circuit configured to determine whether the at least one read sensor is unstable by evaluating whether the at least one read sensor produces a marginal bit error value or worse during one or more read operations by the at least one read sensor in communication with the preamplifier, the read channel and the controller, the marginal bit error value being between first and second predetermined bit error value thresholds, and
the preamplifier comprises a reader recovery circuit configured to carry out a read sensor recovery operation to restore the unstable read sensor to a stable state.

17. A method comprising:
detecting a read error during a first read operation by a read sensor to read data from a first track on a data storage medium;
after the read error is detected, determining whether the read sensor is unstable by evaluating whether the read sensor performs marginally or worse during one or more subsequent read operations, the marginal read sensor performance being determined by comparing at least one readback value from the read sensor with one or more marginal performance indication thresholds; and
in response to determining that the read sensor performs marginally or worse, concluding that the read sensor is unstable; and
in response to the read sensor being unstable, carrying out a read sensor recovery operation to restore the read sensor to a stable state.

18. The method of claim 17 and wherein the carrying out the read sensor recovery operation comprises applying at least one of a bias shock or a thermal shock to the read sensor.

* * * * *